(12) United States Patent
Ersek et al.

(10) Patent No.: US 8,790,436 B2
(45) Date of Patent: Jul. 29, 2014

(54) ORGANIC SOIL AMENDMENTS AND METHOD FOR ENHANCING PLANT HEALTH

(75) Inventors: Barrett Ersek, West Chester, PA (US); Stephen Lange, Middletown (DE)

(73) Assignee: Holganix, LLC, Glen Mills, PA (US)

( * ) Notice: Subject to any disclaimer, the term of this patent is extended or adjusted under 35 U.S.C. 154(b) by 180 days.

(21) Appl. No.: 13/089,576

(22) Filed: Apr. 19, 2011

(65) Prior Publication Data

US 2012/0090365 A1 Apr. 19, 2012

Related U.S. Application Data

(60) Provisional application No. 61/455,339, filed on Oct. 19, 2010.

(51) Int. Cl.
*C05F 11/08* (2006.01)

(52) U.S. Cl.
USPC ............. 71/6; 71/7; 71/8; 71/9; 71/10; 71/11; 71/16; 71/23; 71/24; 71/64.1

(58) Field of Classification Search
USPC .................................................. 71/6–26, 64.1
See application file for complete search history.

(56) References Cited

U.S. PATENT DOCUMENTS

| | | | | |
|---|---|---|---|---|
| 4,952,229 A * | 8/1990 | Muir | | 71/7 |
| 5,057,141 A * | 10/1991 | Rodriquez-Kabana et al. | .. | 71/28 |
| 5,549,729 A * | 8/1996 | Yamashita | | 71/26 |
| 5,876,479 A * | 3/1999 | Hedgpeth, IV | | 71/11 |
| 6,159,262 A * | 12/2000 | Tumbers | | 71/7 |
| 6,309,440 B1 * | 10/2001 | Yamashita | | 71/27 |
| 6,311,426 B1 * | 11/2001 | Mehta et al. | | 47/1.01 F |
| 6,471,741 B1 * | 10/2002 | Reinbergen | | 71/6 |
| 6,727,090 B1 | 4/2004 | Hronek | | |
| 6,852,142 B2 * | 2/2005 | Varshovi | | 71/14 |
| 8,246,711 B2 * | 8/2012 | Marler | | 71/21 |
| 8,262,912 B1 | 9/2012 | Lanciault et al. | | |
| 2002/0108414 A1 * | 8/2002 | McNelly | | 71/9 |
| 2002/0164781 A1 * | 11/2002 | Alms et al. | | 435/290.1 |
| 2002/0174697 A1 | 11/2002 | Reid et al. | | |
| 2003/0113908 A1 | 6/2003 | Hussey et al. | | |
| 2004/0089042 A1 * | 5/2004 | Henderson | | 71/21 |
| 2004/0261481 A1 * | 12/2004 | Anaya-Olvera | | 71/24 |
| 2007/0266751 A1 * | 11/2007 | Black et al. | | 71/11 |
| 2009/0078014 A1 * | 3/2009 | Yamashita | | 71/11 |

(Continued)

OTHER PUBLICATIONS

International Search Report and Written Opinion; International Application No. PCT/US11/32981; International Filing Date Apr. 19, 2011; 12 pages.

*Primary Examiner* — Wayne Langel
(74) *Attorney, Agent, or Firm* — Blank Rome LLP

(57) ABSTRACT

An organic soil amendment comprises a live aerobic culture of beneficial microorganisms, comprising beneficial bacteria and fungi, and additives and plant extracts. The present invention also provides a method for producing an organic soil amendment by extracting beneficial microorganism at least in part from a compost comprising green and brown plant waste, and is free of manure. The extracted beneficial microorganism is amplified, while additional beneficial microorganism maybe added. Plant extracts and other additives are added to the live beneficial microorganism culture. The present invention further provides a method for storing and transporting the organic soil amendment at a reduced temperature, such as refrigeration, freezing, or lyophilizing. In addition, the present invention provides a method for maintaining the viability of the organic soil amendment in a ready to use form.

46 Claims, 2 Drawing Sheets

(56) References Cited

U.S. PATENT DOCUMENTS

| | | |
|---|---|---|
| 2009/0188290 A1 | 7/2009 | Marler |
| 2009/0308121 A1* | 12/2009 | Reddy et al. .......... 71/6 |
| 2010/0010089 A1* | 1/2010 | Van Dyke et al. ........ 514/568 |
| 2010/0024500 A1 | 2/2010 | Tyler |
| 2012/0031157 A1* | 2/2012 | Paikray .............. 71/7 |
| 2012/0057936 A1* | 3/2012 | Cook ............. 405/128.7 |
| 2012/0279266 A1* | 11/2012 | Van Dyke et al. ......... 71/21 |

* cited by examiner

ORGANIC SOIL AMENDMENTS AND METHOD FOR ENHANCING PLANT HEALTH

REFERENCE TO RELATED APPLICATION

This patent application claims the benefit of U.S. Provisional Patent Application No. 61/455,339, filed on Oct. 19, 2010, whose disclosures are hereby incorporated by reference in their entirety into the present disclosure.

FIELD OF INVENTION

This invention relates to organic soil amendments and method for enhancing plant health. Particularly, the present invention provides organic soil amendments, methods for producing organic soil amendments, and methods for transport and maintaining the viability of the organic soil amendments.

BACKGROUND OF THE INVENTION

It is a common practice in the agricultural field both for food production, ornamental shrubs and trees, and lawn grasses to accelerate growth by the application of chemical fertilizers, e.g., nitrates, phosphates, and potassium compounds, and also chemical materials such as pesticides, herbicides, and fungicides, etc., that can be toxic. Further, it is a present practice to overload the crops with these chemical materials and to repeatedly treat most crops multiple times in a growing season (typically four times, may be as many as eight times depending on the pant and location), because these water soluble substances would wash off. The significant amount of runoff means that users must use more of these substances and apply more times, which increased both the monetary and labor cost. The runoff also results in these chemical materials finding their way into the soil and the ground water, and into rivers, lakes, ponds and ultimately the bays and oceans. While these chemicals do enhance the growth of desirable plants, the runoff has toxic effects. Particularly, in that it causes algae blooms, which are the overproduction of a variety of aquatic plants and microorganisms. These algae blooms decrease the oxygen carrying capacity of the water to such an extent that they cause depletion of oxygen or hypoxia for mollusks, mussels, crabs, and other food animals. Ultimately impacting fish and then fish eating mammals such as seals, whales and human.

In fact, these algae blooms create areas termed "dead zones" that are a result of the hypoxia that occurs in these unusual algae blooms. Dead Zones caused by these algae blooms in the Gulf of Mexico are bigger than the state of New Jersey, and are growing every year. The Chesapeake Bay also has experienced substantial dead zones that are growing every year from the same cause. The US Environmental Protection Agency (EPA) is presently establishing new standards to reduce the allowable amounts of these toxic fertilizers, pesticides, herbicides, and fungicides that can be applied to a field.

Recent studies which have shown that these algae blooms are a specific result of toxic chemical fertilizer runoffs. The algae blooms include algae species that produce domoic acid, which is a neurotoxic substance that causes paralysis, dyskinesia and ultimately death in harbor seals, sea lions and pelicans. Further, it has been shown that domoic acid causes Amnesic Shell Fish Poisoning, (ASP). Although these animals do not eat the algae per se, they do feed on the mussels, crabs, mollusks, and fish that feed directly or indirectly on the algae. These fish and shell are also food stuff for human. Consequently, it is under investigation whether this overproduction and overuse of toxic chemicals to enhance the growth of crops paradoxically may be causing an increasing number of some of the neurologic diseases in children.

The present state of the art uses chemicals to enhance plant health by enhancing growth, or to suppress plant killers like diseases, insects, and fungi to ensure healthy plant/crop growth. However, there is no effective way to ensure appropriate types and amounts are applied, and when applied, if they will stay with the target plant or wash off. Thus, chemicals once thought to be relatively harmless have been applied with a broad brush. The broad brush is now being questioned.

SUMMARY OF THE INVENTION

The present invention provides a method for producing an organic soil amendment, comprising the steps of producing an initial extract from a compost by soaking the compost in water, mixing the initial extract with additional water and recirculating the mixture, aerating the mixture, and introducing additives and beneficial fungi to the mixture.

According to one aspect of the invention, the initial extract is produced by soaking a compost comprising plant waste, and free of manure.

According to another aspect of the invention, the initial extract is produced by soaking a compost further comprising shell fish shells. The shell fish shells are preferably about 0.5-1.5% by weight. The shell fish shells preferably comprising at least one of oyster shell, crab shell, and shrimp shell.

According to a further aspect of the invention, the initial extract is produced by soaking the compost in water for about 1-3 days at a temperature typically not exceeding about 120° F.

According to one aspect of the invention, the recirculation is for about 1-2 days at a temperature typically not exceeding about 120° F.

According to one aspect of the invention, the aerating of the mixture is for about 2-24 hours at a temperature typically not exceeding about 120° F.

According to another aspect of the invention, the beneficial fungi comprising at least one of mycorrhizae fungi, trichoderma fungi.

According to a further aspect of the invention, the mycorrhizae fungi comprising at least one of glomus intraradices, glomus mosseae, glomus aggregatum, glomus etunicatum, glomus deserticola, glomus monosporum, glomus clarum, glomus brasilianum, gigaspora margarita, rhizopogon villosullus, rhizopogon luteolus, rhizopogon amylopogon, rhizopogon fulvigleba, pisolithus tinctorius, suillus granulates, suillus punctatapies, laccaria laccata, scleroderma cepa, and scleroderma citrinum.

According to another aspect of the invention, the trichoderma fungi is trichoderma harianum.

According to one aspect of the invention, the additives comprising a supplemented medium. The supplemented medium preferably comprising at least one of molasses, yeast extract, and yucca extract. The total amount of at least one of molasses, yeast extract, and yucca extract is preferably about 6-11% by volume.

According to another aspect of the invention, the additives comprising a plant extract. In one embodiment of the invention, the plant extract is tea tree oil. The tea tree oil is preferably at about 0.0025% by volume.

According to one aspect of the invention, the additives comprising at least one of humic and fulvic acids. In one embodiment of the invention, the at least one of humic and fulvic acids is about 0.0008% by volume.

According to one aspect of the invention, the method for producing an organic soil amendment further comprising refrigerating the mixture at a temperature between about 32-44° F.

According to another aspect of the invention, the method for producing an organic soil amendment of further comprising freezing the mixture.

The present invention also provides an organic soil amendment produced according to the aforementioned method.

The present invention further provides a method of applying an organic soil amendment, comprising the steps of diluting an organic soil amendment comprising a live aerobic culture of beneficial microorganisms with water, and aerating the diluted organic soil amendment to maintain the live beneficial microorganisms in a substantially aerobic state.

According to one aspect of the invention, the method further comprising the steps of spraying the diluted organic soil amendment.

Additionally, the present invention provides an organic soil amendment, comprising a live substantially aerobic culture of beneficial microorganisms, comprising beneficial bacteria and fungi, and additives and plant extracts.

According to one aspect of the invention, the beneficial microorganisms are derived at least in part from a compost comprising green and brown plant waste, and is free of manure.

According to another aspect of the invention, the compost further comprising shell fish shells.

According to a further aspect of the invention, the beneficial fungi comprising mycorrhizae fungi. The mycorrhizae fungi preferably comprising at least one of glomus intraradices, glomus mosseae, glomus aggregatum, glomus etunicatum, glomus deserticola, glomus monosporum, glomus clarum, glomus brasilianum, gigaspora margarita, rhizopogon villosullus, rhizopogon luteolus, rhizopogon amylopogon, rhizopogon fulvigleba, pisolithus tinctorius, suillus granulates, suillus punctatapies, laccaria laccata, scleroderma cepa, and scleroderma citrinum.

According to another aspect of the invention, the beneficial fungi comprising chitin degrading fungi. The chitin degrading fungi preferably comprising trichoderma fungi. In one embodiment of the invention, the trichoderma fungi is trichoderma harianum.

According to a further aspect of the invention, the plant extracts comprising tea tree oil. The tea tree oil is preferably at about 0.0025% by volume.

According to another aspect of the invention, the additives comprising at least one of humic and fulvic acids. In one embodiment of the invention, the at least one of humic and fulvic acids is about 0.0008% by volume.

According to a further aspect of the invention, the additives comprising a supplemented medium. The supplemented medium preferably comprising at least one of molasses, yeast extract, and yucca extract. The total amount of at least one of molasses, yeast extract, and yucca extract is preferably about 6-11% by volume.

According to one aspect of the invention, the organic soil amendment further comprising penicilium fungi, actinobacteria, and nitrogen fixing bacteria.

DESCRIPTION OF THE DRAWINGS

Other objects, features and advantages of the present invention will become more fully apparent from the following detailed description of the preferred embodiment and the accompanying drawings in which.

DETAILED DESCRIPTION OF THE INVENTION

Figure 1:
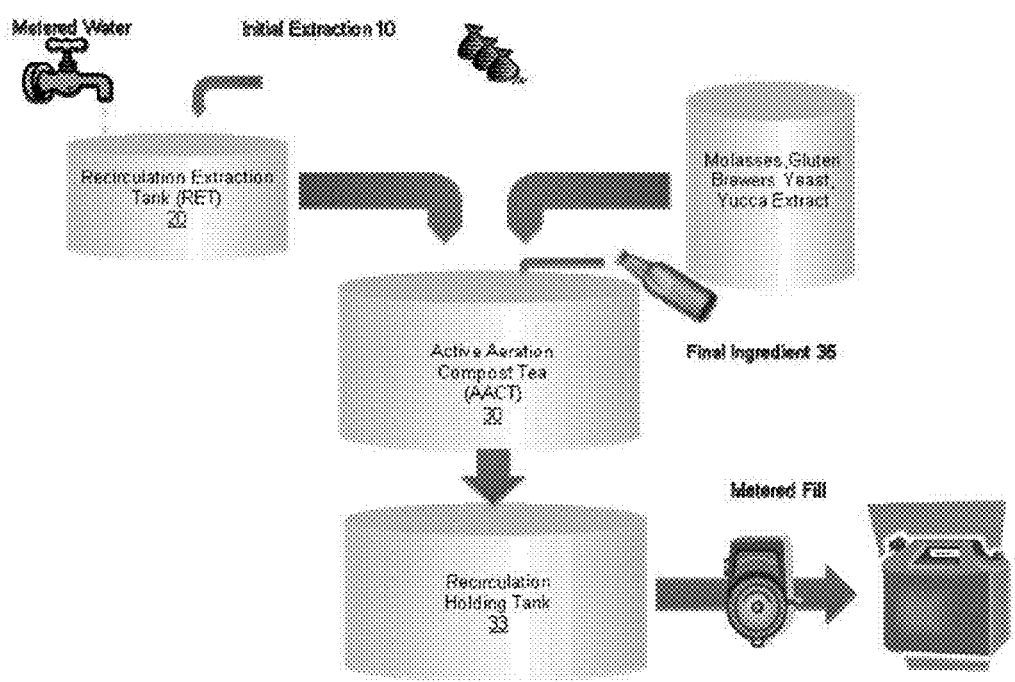
FIG. 1 is a flow chart of a method of producing organic soil amendments of the present invention according to a preferred embodiment.

It is an object of the present invention to provide a method and system to enhance the growth of plants, crops, trees, shrubs, and ornamental lawns by applying organic soil amendments. For example only and not by way of limitation, it is safer and more effective to apply organic soil amendments, which is targeted to identified plant deficiencies. It is a further object of the invention to provide a method and system that enhances plant health by the nurturing of nature by identifying and isolating native microorganisms which include beneficial bacteria, Rodifiers, nematodes, and a variety of flora and fauna, some of which are nitrogen fixing bacteria and chitin degrading bacteria that provide the plants with similar nutrition without the toxic effects of prior art fertilizers. Because they create the living environment of native, naturally occurring organisms whose growth is enhanced they do not wash away with rain and would not cause any of the problems that are seen with the artificially produced chemical fertilizers.

Further, it is an object of the invention to decrease consumption of petroleum product in the production of the organic soil amendments described herein. The light weight resulting from concentrated form of the invention reduces transportation costs significantly. That is, the transportation of the concentrated organic soil amendment is only a few pounds. As an example, a 4.5 gallon jug of an organic soil amendment according to the present invention weighs about 47 lbs, and is sufficient to treat an area of just under 2 acres. In contrast, prior art requires tons of fertilizer to be delivered hundreds of miles from the manufacturing point.

The present invention provides organic soil amendments that introduce to the plants live beneficial microorganisms and other additives. The live beneficial microorganisms are preferably selected based on the indigenous bacteria and fungi flora and fauna in a selected region where the plants are located. Regions with similar soil types and weather patterns may be assigned to zones. It is more preferable that the beneficial microorganisms and other additives are selected based on certain identified soil deficiency of a region. The present invention organic soil amendments do not necessarily provide nitrogen, potassium, and phosphate compounds that can be directly absorbed by the plants. Rather, the present invention organic soil amendments facilitate the plants to more effectively utilize the nutrition that is already present in the surrounding soil. The live beneficial microorganisms within the present invention organic soil amendments break down the organic matter that is present in the soil, which is then converted to forms that is absorbable by the plants.

The present invention organic soil amendments do not preclude the contemporary use of nitrogen, potassium, and phosphate compounds to treat the plants. In fact, the present invention soil amendments would make the plants more effectively absorb the applied nitrogen, potassium, and phosphate compounds. As result, less chemical fertilizers and less times of application are required. In another embodiment, small amounts of nitrogen, potassium, and phosphate compounds can be added to the soil amendments, which can assist the effectiveness of the soil amendments.

The beneficial microorganisms of the present invention are at least in part derived from indigenous soil bacteria and fungi of a selected region or zone. Compost from green or brown plant waste of a selected region or zone provides a good source of such microorganism. No manure is used in the present invention organic soil amendments or in the process of producing the same. The composting process is typically according to U.S. Compost Council rules for composting, which are well known to one skilled in the art. Additional beneficial microorganisms can be supplemented as isolates, which may be of a single strain or multiple strains.

In another aspect of the invention, the organic soil amendments comprise chitin degrading microorganisms, which may include, without limitation, chitin degrading bacteria and/or fungi. The chitin degrading microorganisms may attack the cell walls of diseases causing fungi or the exoskeleton of insects, and strengthen the cell wall of the plants protecting them from insects and diseases, which can improve overall plant health.

Chitin degrading microorganisms may be introduced by incorporating shell fish shells in the aforementioned compost. Preferred shell fish shells may include crab shells, shrimp shells, and oyster shells. The amount of shell fish shells is typically of a faction of the total compost materials. Preferably, the shell fish shells are of about 0.1% to 5% by weight of the total compost materials. More preferably, the shell fish shells are of about 1.5%. Chitin degrading microorganisms may be also introduced by adding isolates of the microorganisms to the organic soil amendments.

In one aspect of the invention, the live beneficial microorganisms of the soil amendments are amplified to a high concentration by culturing the microorganisms in a supplemented medium. A supplemented medium means a culture medium that is enriched with nutrition for microorganism growth within this application. Typically, a supplemented medium would include a carbon source, such as forms of simple and complex sugars (e.g., molasses), and protein source, which provides simple amino acids, or amino acids in the form of peptides and proteins, such as yeast extract or gluten.

It is an aspect of the invention to keep the live beneficial microorganisms in an aerobic state. When applied to the plants, the live beneficial microorganisms can immediately start to breakdown the organic matters in the soil and exert beneficial effects to the plants.

In another aspect of the invention, the organic soil amendments are kept at a reduced temperature for storage and transportation without significant compromising the viability of the live beneficial microorganisms. The organic soil amendments may be refrigerated, frozen, or lyophilized. The organic soil amendments may be refrigerated at between 32° F. to 44° F.

In another aspect of the invention, the organic soil amendments can be stored and transported in a frozen state. The live beneficial microorganisms can be reinvigorated quickly once the organic soil amendments are thawed and bring to ambient temperature, preferably with aeration and/or agitation.

In yet another aspect of the invention, the organic soil amendments can be lyophilized. The organic soil amendments are first frozen. Water within the organic soil amendments is removed under vacuum. This process further reduced the weight of the organic soil amendments for storage and transportation. The organic soil amendments can be reconstituted and reinvigorated prior to application.

Figure 2:
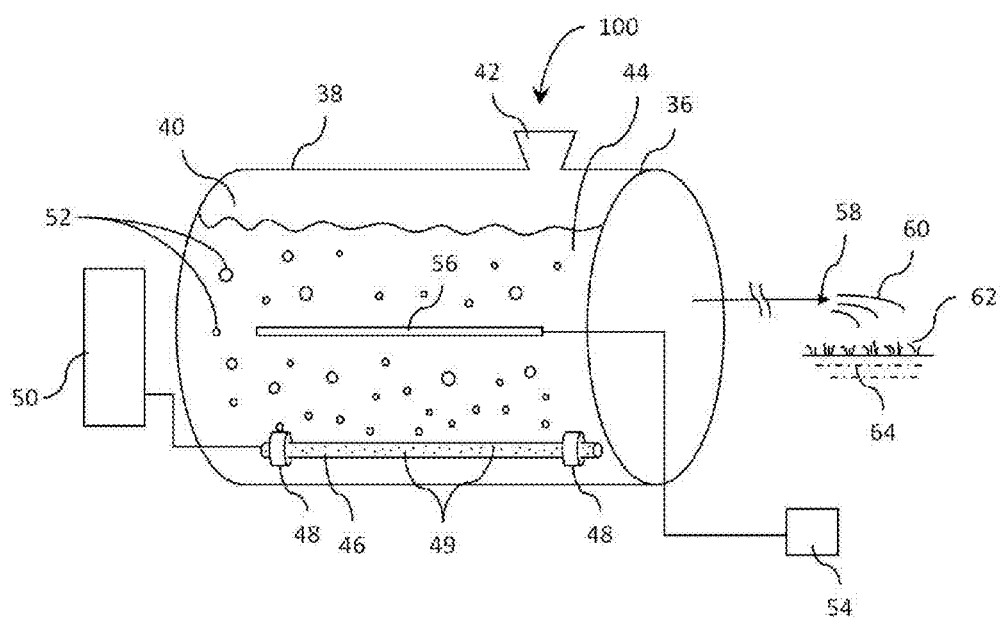
FIG. 2 is a schematic of a vessel according to one embodiment of the present invention.

In another aspect of the invention, the concentrated organic soil amendments can be diluted with water before applied to the plants. Diluted organic soil amendments can be stored for a prolonged period of time, e.g., as long as 30 days, without losing viability. To maintain the live beneficial microorganism in a substantially aerobic state, dissolved oxygen in the diluted organic soil amendments is preferably kept at an optimal level. It is preferable to supply enough oxygen to the diluted organic soil amendments though slow aeration. Conventional devices and apparatus for slow aeration of a body of liquid can be readily adapted for this purpose by one skilled in the art. One embodiment of such a device is illustrated in FIG. 2.

In another aspect of the invention, the organic soil amendments comprise plant extracts. For example without limitation, plant extracts that would stimulate the uptake of herbicides by unintended plants, e.g., weeds, which would drastically reduced the amount of herbicide needed to maintain the desired plants. Other plant extracts that promote healthy plant geowth can be used with the present invention organic soil amendments.

One of the preferred plant extracts that can be incorporated to the organic soil amendments is tea tree oil, as an example Melaceulca oil, or terpinen-4-ol type. It is preferably an essential oil steam distilled from the leaves and terminal branches of Melaleuca alterniforni. Another preferred plant extract is extract of the yucca plant (Yucca schidigera), which comprises polysaccharides. For example, without limitation, 1% Yucca schidigera extract mixed with molasses may be added to the organic soil amendments.

In another aspect of the invention, the organic soil amendments comprise components that provide humic acids and/or fulvic acids, which would promote healthy plant growth. For example, without limitation, compounds or preparations containing humic and/or fulvic acids may be added to the organic soil amendments.

The present invention is better understood with the following process of producing an exemplary organic soil amendment.

The process typically begins with a compost derived from plant waste (green and brown)/vegetable waste, crab shells, oyster shells, and shrimp shells. Compost mix is made and aerated by turning to maintain aerobic decomposition reaching 160° F. for 3 consecutive days (standard U.S. Composting Council rules for composting). Temperatures are checked daily to determine turning times and frequency. Time of year can affect the time required for composting. To accommodate particular needs for plants of a certain region, a compost is made specifically for each region and stored refrigerated for the development of the organic soil amendment for each of the regions. For example, the United State and Canada may be divided into 11 regions. Each region has slightly different biomasses, therefore, a different compost is developed. Green and brown wastes from these 11 separate regions are collected and used to make the compost for each region.

Once the compost is finished it is stored for use. For example, 3-5 lbs finished compost is put into a permeable sack and placed in a 5 gallon pail. The sack is left to stand for 72 hours with temperatures not to exceed 120° F. This step is termed Initial Extraction ("IE") 10. This solution is then placed in a 250 gallon Recirculation Extraction Tank (RET) 20 to run from 12-24 hours. Time of year affects the length of time required. The tank temperature is to not exceed 120° F. This solution is then transferred to an "Active Aerated Compost Tea" (AACT) 30 tank and aerated for 2-24 hours. Again, the timing depends on volume of production as well as ambient temperature changes from season to season. During the AACT process, specific final ingredients 35, such isolates of additional beneficial microorganism, plant extracts, and supplemented medium, are introduced at specific intervals to feed the compost organisms, and increasing the development of the biotic population. Typically, the temperature should not exceed 120° F. However, should the temperature rise above 120° F., the process can be slowed quickly to maintain 120° F. The organic soil amendment is cured once the temps are between about 68 and 88° F. This process typically takes 24 hours to develop the "Nurse Batch". Once the batch is finished it is then dropped into a holding tank 33 with slow aeration and slow recirculation to maintain minimal activity of the beneficial microorganism.

Once the first "Nurse Batch" is made, sequential batches can be directly made, using the initial "Nurse Batch" to inoculate the preceding batch allowing for multiple product processing. For example, 22 gallons of the "Nurse Batch" can be introduced to the RET, which may be combined with IE in the tank, and re-circulated for 2 hours, followed by transferring to the AACT for aeration for 2-24 hours, and sent to the holding tank 33 for processing.

The organic soil amendment is then moved to bottling and or bulk delivery (the "Bottling Stage"). The product is placed in 4.5 gallon units and placed in refrigeration below 44° F. to slow the biotic activity in the container, and maintain the life of the biotic solution for long term storage and delivery. Bulk delivery is taken directly to the end user and an aeration device is used to preserve the biotic activity of the organic soil amendment maintaining a temperature below 120° F. for end use for up to 30 days once diluted for end use.

The refrigeration process is unique to all other products as the present invention organic soil amendment is kept alive during the entire process. The pasteurization process that inactivates the potentially harmful microorganisms is completed during the Compost Stage. The curing and biotic activity is maintained through the mixing process by maintaining temperatures below 120° F. during the entire process.

Live beneficial microorganisms found in the present invention organic soil amendments are many. Typically, a great portion is "Normal Flora" and does not have specific identity. However, these are most significant in the workings of the organic soil amendment. It is desirable to include Mycorrhizae fungi in the organic soil amendments. Typically, Mycorrhizae fungi may include, without limitation, any one of the following genus/species: Glomus intraradices, Glomus mosseae, Glomus aggregatum, Glomus etunicatum, Glomus deserticola, Glomus monosporum, Glomus clarum, Glomus brasilianum, Gigaspora margarita, Rhizopogon villosullus, Rhizopogon luteolus, Rhizopogon amylopogon, Rhizopogon fulvigleba, Pisolithus tinctorius, Suillus granulates, Suillus punctatapies, Laccaria bicolor, Laccaria laccata, Scleroderma cepa, and Scleroderma citrinum. The Mycorrhizae fungi may be from the compost or inoculated as isolates of difference species of Mycorrhizae fungi or mixtures thereof. For example, a mixture of Mycorrhizae fungi isolates may be added to the organic soil amendments during the amplification process.

Other fungi isolates that may be added to the organic soil amendments during the amplification process may include chitin degrading fungi, for example, without limitation, trichoderma harzianum.

The growth that is appearing in the present invention supper concentrate is mycelia growth from the Oxygen remaining in the container allowing for Penicullum and Actinobacteria to grow. Penicillium growth can be unsightly and challenging to mechanical processes, however, the production of these organisms is extremely beneficial to plants and soils. Screening off of the mycelial growth will not detract from the efficacy of the organic soil amendment and may in fact increase the efficiency of natural disease suppression growing higher populations of Actinobacteria or actinoycium.

Penicillium fungi produces Penicillin antibiotics, which are historically significant because they are the first drugs that were effective against many previously serious diseases. All penicillins are Beta-lactam antibiotics and are used in the treatment of bacterial infections caused by susceptible, usually Gram-positive, organisms. The term "penicillin" can also refer to the mixture of substances that are naturally, and organically, produced.

Actinobacteria include some of the most common soil life, freshwater life, and marine life, playing an important role in decomposition of organic materials, such as cellulose and chitin, and thereby playing a vital part in organic matter turnover and carbon cycle. This replenishes the supply of nutrients in the soil and is an important part of humus formation. Other Actinobacteria inhabit plants and animals.

Actinobacteria are well known as secondary metabolite producers and hence of high pharmacological and commercial interest. In 1940 Selman Waksman discovered that the soil bacteria he was studying made actinomycin, a discovery for which he received a Nobel Prize. Since then, hundreds of naturally occurring antibiotics have been discovered in these terrestrial microorganisms, especially from the genus Streptomyces.

Some Actinobacteria form branching filaments, which somewhat resemble the mycelia of the unrelated fungi, among which they were originally classified under the older name Actinomycetes. Most members are aerobic, but a few, such as Actinomyces israelii, can grow under anaerobic conditions. Unlike the Firmicutes, the other main group of Gram-positive bacteria, they have DNA with a high GC-content, and some Actinomycetes species produce external spores.

Some types of Actinobacteria are responsible for the peculiar odor emanating from the soil after rain (Petrichor), mainly in warmer climates. The chemical that produces this odor is known as Geosmin. The growth is unique to any other product.

The present invention organic soil amendments may also comprise nitrogen fixing bacteria, such as Rhizobiales, Frankia, Azospirillum, Azotobacter, Bacillus subtilis, Bacillus licheniformis, Lactobacillus acidophilus, Bacillus popilliae, and Chitinibacter tainanensis.

In particular, in accordance with one embodiment, the invention provides a vessel for maintaining the organic soil amendments in a ready to use form. The vessel comprises with an inside and an outside with an organic soil amendment introduction port connecting the inside with the outside where microbes are introduced to the vessel. An aerator is provided on the inside of the vessel, a gas supply is connected with the aerator, a temperature control device is connected with the vessel and a special spray device is connected with the vessel.

In another aspect, the gas supply is oxygen-nitrogen. In still another aspect, the aerator is secured to the inside of the vessel at the bottom of the vessel. In one aspect, the aerator is a tube that includes a sintered weight connected with the tube and in another aspect, the sintered weight is selected from a group consisting of: stone, steel and steel and plastic wool.

An exemplary embodiment according to the present invention is illustrated by way of example in FIG. 2. An organic soil amendment storage system 100 is illustrated with reference to a vessel 36. Vessel 36 includes an inside 38 and an outside 40 and an organic soil amendment introduction port 42, wherein organic soil amendment is introduced to the vessel 36. Vessel 36 includes water 44 or some other medium for reanimation of the live beneficial microorganisms.

Additionally, vessel 36 includes an aerator 46 on the inside 38. Aerator 46 is secured within vessel 36 and may include sintered weights 48 that may be made of stone, steel or steel or plastic wool for example only for the purpose of weighting aerator 46.

A gas supply 50 is connected with aerator 46 as illustrated for the purpose of delivering re-animation enhancing gas 52, such as $O_2$—$N_2$ or ambient air, to the aerator. Aerator 46 includes fenestrations 49 which evenly distribute gas 52.

Further, temperature control device 54 is connected with vessel 36 in any efficient manner, such as by means of a heating element 56 on the inside 36 as illustrated, for example only. Proper temperature control ensures the most efficient re-animation possible and temperature control device 54 enables a user to adjust the temperature as needed to compensate for local conditions. Heating element 56 may be located in any desired place in the invention and may, for example only and not by way of limitation, be placed in series with gas supply 50 so as to heat the gas 52 evenly prior to introduction into the vessel 36.

Still referring to FIG. 2, a sprayer 58 may be connected with vessel 36 for the purpose of applying organic soil amendment 60 to plants 62 and/or to soil 64.

By way of further description and disclosure, Applicants have developed a unique combination of indigenous microorganisms and nutrients to enhance plant health, quality and quantity without artificial chemical fertilizer. What is included, as has been discussed above, is a combination of indigenous microorganisms that are first identified by the procurement of a sample of decomposed plant material (compost) and the microorganisms that digest these plants. The microorganisms then are grown in a tissue culture medium and their specific nutritional requirements are met (deficiencies remedied) at an optimal temperature for growth. Then they are hydrated at a proper temperature for growth and aerated so that a few microorganisms grow into millions in a matter of hours. Once a critical concentration of these organisms is achieved, they are then cooled and refrigerated or frozen and preserved to facilitate storage and transportation. Once taken to the site for use, they are reanimated and they are brought up to a specific concentration for the desired/required effect for the economical enhancement of the area to be treated.

According to one aspect, the system and method functions to enhance plant health by way of a unique combination of microorganisms and plant extracts to suppress plant diseases, insects, and fungi without artificial pesticides. Again, it is prior art to suppress plant diseases, insects and fungi by applying artificial toxic pesticides to a crop. This is done by dry chemical granules or by liquid spraying. In either case, the pesticides are toxic chemicals which can kill these organisms. According to the present invention, a unique combination of microorganisms and plant extracts are created that suppress plant diseases, insects and fungi by enhancing the growth of the plants to that their natural growth and resistance can be enhanced without the presence of these toxic pesticides. This is done by growing beneficial bacteria that are beneficial to the plants, or at least not harmful, but which have a negative effect on the target plants, insects and fungi. Specifically, the beneficial bacteria are not harmful to the desired plants but suppresses the target plants (e.g. weeds), insects and fungi. The desired bacteria, Paenibacillus popilliae, B-Sybtillis, B-Magatoium, B-Pumillis, B-Lichenformis, B-Azotofor-mans, B-Polymyxa, Streptomyes, Tricoderma and Chitin degrading Bacillis, for example only and not by way of limitation, penetrates the insect and damages the insect or causes the insect to change its feeding and reproductive habits by causing them to eat other plants; for plants, the beneficial bacteria makes nutrients and other food sources available to the plant, increasing the cell wall thickness of the plant giving it a natural defense against fungus/disease. That is, the desired beneficial bacteria degrades the bad bacteria by decreasing its cell wall thickness, enhances plants by increasing its cell wall thickness and by attacking insects or driving then away. By way of further explanation, according to the present invention, cell wall integrity is increased by combinations of beneficial bacteria fungi protozoa and nematodes are critical. While nitrogen fixing bacterial produce and store nitrogen, protozoa must find and feed on the bacteria in order for it to convert into a form of nitrogen that can be used by plants. Therefore the balance of bacteria and protozoa is critical to effective nitrogen usage by plants. Flagellates, Amoebae, Ciliates. These are the three groups of protozoa and they are critical in a bacterial-dominated soil, because the plants need a way to access all the wonderful nutrients tied up in the bacteria. Nutrients within the bacteria cannot be obtained by plant roots, so something has to eat the bacteria to release those nutrients. That's what protozoa do. Protozoa also help build the larger soil pores by pushing aggregates around as the protozoa search for and try to reach the bacteria tucked away around soil particles. Bacterial-feeding nematodes, Fungal-feeding nematodes and Predatory nematodes. The beneficial nematodes consume their prey groups, and in the case of bacterial- and fungal-feeders, release N, P, S, and micronutrients that would now be available to plants, if the majority of the cycling occurs in the root system. These nematodes also interfere with the ability of the root-feeding nematodes (destructive to plants) finding the root. The higher number of these beneficial organisms, the more nutrient cycling is occurring. A 4 to 1 ratio of beneficial microorganisms to non-beneficial organisms is the natural balance to be achieved.

According to another aspect of the system and method, enhancing plant health is accomplished by means of a unique combination of polysaccharides, plant extracts and microorganisms that suppress regrowth and propagation of weeds by increasing the effectiveness of artificial manufactured herbicide by a factor of ten.

The combinations of Amino, Humic and Fulvic acids stimulate growth hormones in plants allowing them to ingest a far greater amount of herbicide than a plant that is not stimulated by these acids. The acids are produced from the plant extracts and essential oils that are added to the process that enable the growth of beneficial organisms to perpetuate and increase releasing more of the food sources to stimulate plants. Similar to growth regulation, the plant growth is enhanced allowing for the herbicides to work efficiently with less applied artificial stimulation.

In the prior art, it is the prior practice to apply pesticides to plants and crops in order to kill weeds or discourage them so they leave the area or die. The usual herbicides function by suppressing weed growth and herbicides work by entering the unwanted weeds and enter into the plant. It interrupts the core plant's ability to conduct photosynthesis deep in the plant cells. If the plant continues to grow but can not feed itself, it actually grows itself to death. In order for herbicides to work, it has to enter the plant. In order to enter the plant, it needs to first decrease the surface tension to stick to the weed and then ultimately to penetrate the weed.

Most herbicides are wasted in the typical application process because 90% of the herbicide does not end up on the leaves that are the target. That is, one is required to put down, spray, a lot of herbicide in order to make sure that some of it ends up sticking to the plant. The problem is getting the herbicide to stick to the target plant efficiently so that application amounts can be greatly reduced.

Applicants have determined that a combination of polysaccharides and plant extracts 1) decreases the surface tension of the herbicide solution so that it enters the plant more readily; and 2) decreases the hydrophobic surface tension of the waxy coat of weeds so that the surfactant is able to penetrate into the weeds more effectively. The indigenous microorganisms of the present invention open the stomata pores of the plants which further eases the entry of the herbicide into the plant. It has the effect of taking a hypodermic needle and injecting the herbicide into the weed as opposed to simply randomly broadcasting the herbicide. The process creates a focused herbicide that sticks to the target plants, penetrates the plants and kills them.

Combinations of molasses, corn syrup, gluten, brewer's yeast as well as the Amino acid groups, Agrinine, Aspargine-from α-ketosuccinamic acid, glutamic acid, tyrosine, aspartic acid, alanine, praline, glutamine, protolignin (MGL) ornithine, citrulline and cystine like amino acids, and several fatty acids (dodecanoic, tetradecanoic, elcosanic, etc.) reduce the surface tension of plants allowing for the herbicide to penetrate the plant efficiently. The growth stimulation that occurs from the sugar production increases the opening of Stomata (pores) of the plant creating instant absorption and translocation of the herbicide causing quick decline of weeds.

In the past, when attempting to enhance microbial growth in a tissue culture, it was necessary to supply nutrients to the culture medium, water, temperature, and aeration for optimum bacterial growth. Transportation was then done in large pots of 275 gallons which is cumbersome and has a limited job life because these organisms must be aerated, maintained at certain temperatures or they perish. In these confined spaces, there are living growths which produce waste materials that would pollute the entire colony and kill them all in 3 to 4 days by creating an anaerobic environment causing death.

Alternatively, the Applicants also have developed a system and method for enhancing plant health by means of concentrating these desired microorganisms, causing their subsequent hibernation and then reanimation. This allows them to be stored for a long period of time in hibernation, delivered to the desired site for application and at the time they are needed they are reanimated as living organisms. This results in the need to transport very compact material instead of 275 gallons or more of liquid. The same amount of living organisms can be found and stored in four 5 gallon containers which is a factor of 10 to 1. This substantially decreases transportation costs, effort and equipment. Further, once a culture of beneficial microorganisms has been developed it is then possible to place them and sustain them in animation, hibernation so as to keep a living inventory for a prolonged period of time. Some studies suggest that living cells can be stored for as long as 100 years if they are properly frozen. One means for concentrating the organisms is evaporation. One means for suspending animation is freezing.

By way of further description, the prior art manufacture of nitrate, phosphates, and potassium require large amounts of natural gas or petroleum and it byproducts in the production of these raw materials. The transportation of these chemicals requires the consumption of additional fuel to deliver tons of products hundreds of miles from manufacturing plants. The present invention allows specific native microbes to be multiplied "on site" much nearer to the site of final use. A few pounds of concentrated living microbes can be multiplied on site overnight to provide trillions of organisms for use when kept at an optimum temperature and gives virtually unlimited nutrients. For example, two microbes can reproduce to twenty in a few seconds then twenty times two hundred and on and on all within a few minutes. Specifically, one acre can be treated with about twenty pounds of concentrated microbes, whereas one acres of the prior art nitrate, phosphate and potassium mix would take approximately seventy pounds of material per acre.

Still further, by way of another advantage of the present invention, because of the "living" nature of the beneficial microorganisms, the number of applications required per year can be substantially less because they are stronger and last longer.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention.

What is claimed:

1. A method for producing a liquid organic soil amendment, comprising the steps of:

(a) producing an initial extract from a compost having live beneficial microorganisms by soaking the compost in water;

(b) mixing the initial extract with additional water and recirculating the mixture;

(c) aerating the mixture following step (b);

(d) adding a supplemented medium or media to the mixture to feed the live beneficial microorganisms and promote their growth during the aerating step;

(e) introducing additives and beneficial fungi to the mixture, and (f) refrigerating the mixture, wherein the mixture formed by the method is a liquid concentrated organic soil amendment.

2. The method for producing an organic soil amendment of claim 1, wherein the initial extract is produced by soaking a compost comprising green and brown plant waste, and is free of manure.

3. The method for producing an organic soil amendment of claim 2, wherein the compost is made and aerated by turning according to the U.S. composting council standard.

4. The method for producing an organic soil amendment of claim 1, wherein the initial extract is produced by soaking a compost comprising shell fish shells.

5. The method for producing an organic soil amendment of claim 4, wherein the shell fish shells comprise about 0.5-1.5% by weight of the compost.

6. The method for producing an organic soil amendment of claim 1, wherein the shell fish shells comprise oyster shells, crab shells, shrimp shells, or a combination thereof.

7. The method for producing an organic soil amendment of claim 1, wherein the initial extract is produced by soaking the compost in water for about 1-3 days.

8. The method for producing an organic soil amendment of claim 1, wherein the mixture is recirculated for about 1-2 days.

9. The method for producing an organic soil amendment of claim 1, wherein the mixture is aerated for about 2-24 hours.

10. The method for producing an organic soil amendment of claim 1, wherein the beneficial fungi comprises mycorrhizae fungi, Trichoderma fungi, or a combination thereof.

11. The method for producing an organic soil amendment of claim 10, wherein the mycorrhizae fungi comprises Glomus intraradices, Glomus mosseae, Glomus aggregatum, Glomus etunicatum, Glomus deserticola, Glomus monosporum, Glomus clarum, Glomus brasilianum, Gigaspora margarita, Rhizopogon villosullus, Rhizopogon luteolus, Rhizopogon amylopogon, Rhizopogon fulvigleba, Pisolithus Tinctorius, Suillus granulates, Suillus punctatapies, Laccaria bicolor, Laccaria laccata, Scleroderma cepa, Scleroderma citrinum, or a combination thereof.

12. The method for producing an organic soil amendment of claim 10, wherein the Trichoderma fungi comprises Trichoderma harianum.

13. The method for producing an organic soil amendment of claim 1, wherein the supplemented medium comprises molasses, yeast extract, yucca extract or a combination thereof.

14. The method for producing an organic soil amendment of claim 1, wherein the amount of molasses, yeast extract, and yucca extract is about 6-11% by volume.

15. The method for producing an organic soil amendment of claim 1, wherein the additives comprise a plant extract.

16. The method for producing an organic soil amendment of claim 15, wherein the plant extract is tea tree oil.

17. The method for producing an organic soil amendment of claim 16, wherein the amount of tea tree oil is about 0.0025% by volume.

18. The method for producing an organic soil amendment of claim 1, wherein the additives comprise humic acids, fulvic acids, or a combination thereof.

19. The method for producing an organic soil amendment of claim 18, wherein the amount of humic acids, fulvic acids, or a combination thereof is about 0.0008% by volume.

20. The method for producing an organic soil amendment of claim 1, wherein the beneficial fungi comprises chitin degrading fungi.

21. The method for producing an organic soil amendment of claim 1, wherein the mixture is refrigerated at a temperature between about 32° F. and about 44° F.

22. The method for producing an organic soil amendment of claim 7, wherein the initial extract is produced at a temperature not exceeding about 120° F.

23. The method for producing an organic soil amendment of claim 8, wherein the mixture is recirculated at a temperature not exceeding about 120° F.

24. The method for producing an organic soil amendment of claim 9, wherein the mixture is aerated at a temperature not exceeding about 120° F.

25. The method for producing an organic soil amendment of claim 1, wherein the beneficial fungi are selected based on the indigenous bacteria and fungi flora and fauna in the region where the liquid organic soil amendment is to be used.

26. The method for producing an organic soil amendment of claim 1, wherein the beneficial fungi and additives are selected based on identified soil deficiencies in the region where the liquid organic soil amendment is to be used.

27. The method of claim 1, wherein the organic soil amendment is sufficiently refrigerated to slow the biotic activity in the organic soil amendment while maintaining the life of the biotic solution for storage and delivery.

28. The method of claim 1, further comprising (g) diluting the liquid organic soil amendment with water, and (h) applying the diluted organic soil amendment onto soil and/or plants.

29. The method of claim 28, wherein (1) the method further comprises applying fertilizer onto the soil and/or plants, and (2) the organic soil amendment enhances the absorption of the fertilizer by the plants.

30. The method of claim 28, wherein (1) the method further comprises applying herbicide onto the soil and/or plants, and (2) the organic soil amendment stimulates the uptake of the herbicide by unintended plants thereby reducing the amount of herbicide needed to maintain the desired plants.

31. The method of claim 1, further comprising (g) diluting the liquid organic soil amendment with water, (h) aerating the diluted organic soil amendment to maintain the live beneficial microorganisms in a substantially aerobic state, and (i) applying the diluted organic soil amendment onto soil and/or plants.

32. A refrigerated liquid organic soil amendment produced by a method comprising the steps of:
producing an initial extract from a compost by soaking the compost in water;
mixing the initial extract with additional water and recirculating the mixture for about 1-2 days at a temperature not exceeding about 120° F.;
aerating the mixture;
adding a supplemented medium to the mixture; and
introducing additives and beneficial fungi to the mixture,
wherein the organic soil amendment formed by the method is (i) a liquid concentrated organic soil amendment and (ii) refrigerated at between 32 and 44° F.

33. The liquid organic soil amendment of claim 32, wherein beneficial microorganisms in the liquid organic soil amendment are derived at least in part from a compost comprising green and brown plant waste, and is free of manure.

34. The liquid organic soil amendment of claim 33, wherein the compost further comprises shell fish shells.

35. The liquid organic soil amendment of claim 32, wherein the beneficial fungi comprise mycorrhizae fungi.

36. The liquid organic soil amendment of claim 32, wherein the beneficial fungi comprise chitin degrading fungi.

37. The liquid organic soil amendment of claim 36, wherein the chitin degrading fungi comprise Trichoderma fungi.

38. The liquid organic soil amendment of claim 37, wherein the Trichoderma fungi is Trichoderma harianum.

39. The liquid organic soil amendment of claim 32, wherein the additives comprise a plant extract, and the plant extract comprises tea tree oil.

40. The liquid organic soil amendment of claim 32, wherein the additives comprise at least one of humic and fulvic acids.

41. The liquid organic soil amendment of claim 32, wherein the additives comprise a supplemented medium.

42. The liquid organic soil amendment of claim 41, wherein the supplemented medium comprise at least one of molasses, yeast extract, or yucca extract.

43. The liquid organic soil amendment of claim 42, wherein the total amount of at least one of molasses, yeast extract, or yucca extract is about 6-11% by volume.

44. The liquid organic soil amendment of claim 32, further comprising: Penicilium fungi, actinobacteria, and nitrogen fixing bacteria.

45. The refrigerated liquid organic soil amendment of claim 32, wherein the organic soil amendment is sufficiently refrigerated to slow the biotic activity in the organic soil amendment while maintaining the life of the biotic solution for storage and delivery.

46. A method of applying an organic soil amendment, comprising the steps of:
diluting a concentrated liquid organic soil amendment of claim 32; and aerating the diluted organic soil amendment to maintain the live beneficial microorganisms in a substantially aerobic state; and spraying the diluted organic solid amendment.

* * * * *